United States Patent [19]

Shull

[11] 4,358,214

[45] Nov. 9, 1982

[54] RATTAN JOINT

[76] Inventor: John C. Shull, 4996th CA DET(RTU) APO, San Francisco, Calif. 96528

[21] Appl. No.: 71,787

[22] Filed: Aug. 31, 1979

[51] Int. Cl.³ .............................. B25G 3/00; F16B 7/08
[52] U.S. Cl. .................................... 403/234; 403/178; 403/263; 403/264; 403/292
[58] Field of Search ............... 403/178, 194, 231, 234, 403/237, 345, 346, 347, 292, 263, 264, 256, 356

[56] References Cited

U.S. PATENT DOCUMENTS

| 2,105,651 | 3/1939 | Ewing | 403/178 X |
| 3,233,871 | 2/1966 | Schroer | 403/292 X |
| 3,884,002 | 5/1975 | Logie | 403/292 X |
| 3,960,460 | 6/1976 | Fischer | 403/292 |
| 4,012,153 | 3/1977 | Pidgeon | 403/231 X |
| 4,092,076 | 5/1978 | Sherrer | 403/178 |
| 4,150,907 | 4/1979 | Thurnauer | 403/234 |

FOREIGN PATENT DOCUMENTS

| 544385 | 6/1956 | Italy | 403/178 |
| 7714487 | 8/1979 | Sweden | 403/231 |
| 545887 | 6/1942 | United Kingdom | 403/178 |

*Primary Examiner*—Wayne L. Shedd

[57] ABSTRACT

The disclosure relates to an improved rattan joint in a knockdown form employing a tonque and groove connection with the tongue extending diametrically to cover the outermost layer of the rattan and said joint being rigidified and securely fixed together by unique fastening means.

3 Claims, 12 Drawing Figures

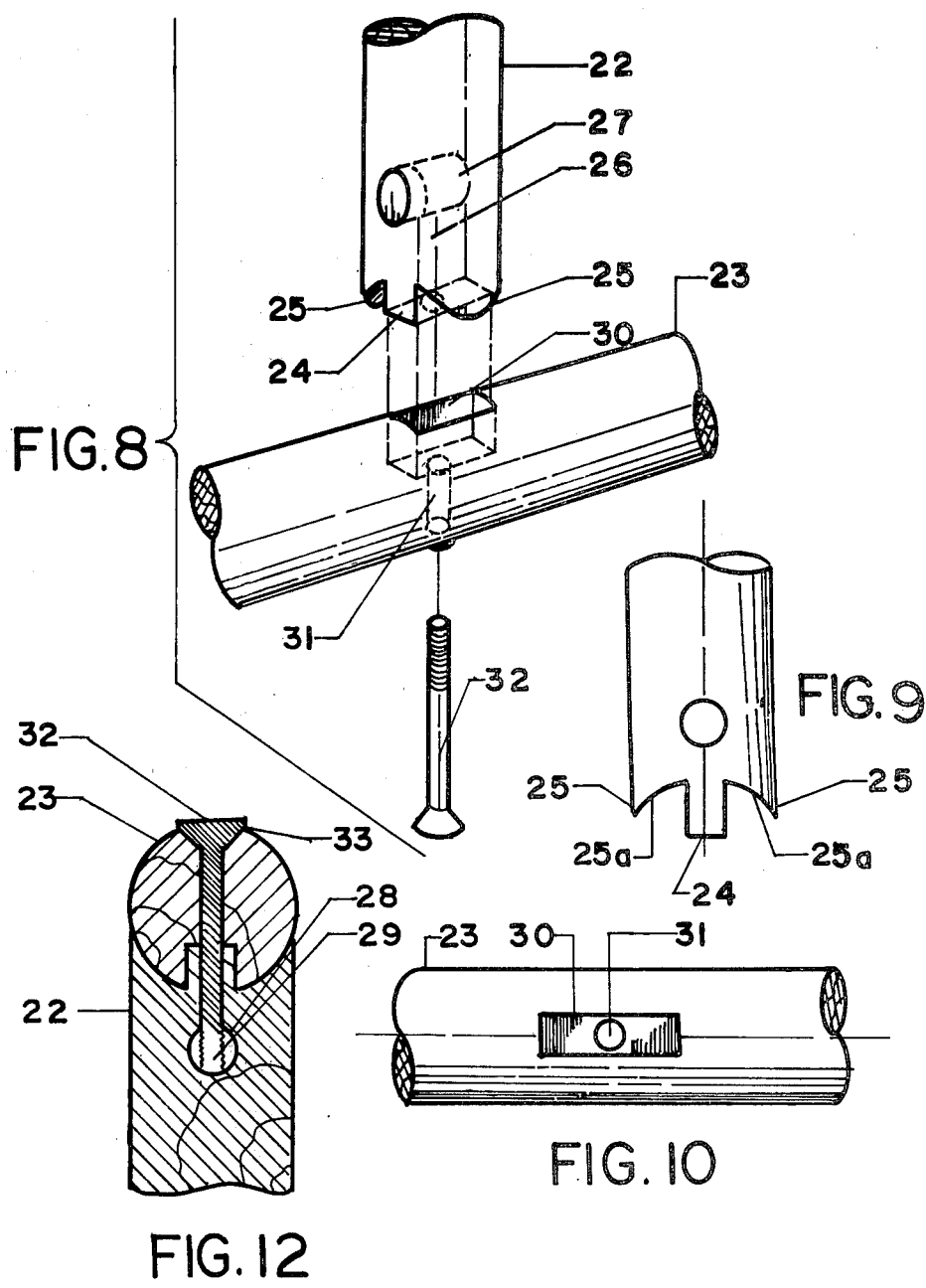

RATTAN JOINT

This invention relates in general to furniture joints. More specifically, it concerns with an improved rattan joint.

Generally, the rattan pole members in a rattan furniture are joined together tightly by the use of bindings. This type of joint for rattan furnitures has been found to be the most stable due to the properties inherent in a rattan. But then, the articles formed would be quite bulky and spacious when transported to distant places and the cost of transportation would be a problem. Furthermore, the bindings employed would be time-consuming in its application and is not so durable enough to last with the rattan pole members.

A study on the nature of rattan, however, shows that the outermost layer of a rattan pole is tough due to the inherent flexibility of its fibres. With this finding, the bindings employed in conventional rattan joints could be substituted with a knockdown form of joint wherein the outermost layer of a rattan is utilized and the joint rigidified.

Accordingly, it is the main object of this invention to provide an improved rattan joint in a knockdown form employing a tongue and groove connection and with the tongue extending diametrically to cover the outermost layer of the rattan and said joint being rigidified and securely fixed together by an unique fastening means.

A further object is to provide an improved rattan joint wherein the fastening means of the above joint is by the use of a dowel and screw combination.

A still further object of this invention is to provide an improved rattan joint which is easy to assemble at site to form a rigid and sturdy structure without the need of skilled workmen.

In order to illustrate the invention drawing figures of the embodiments of rattan joints constructed in accordance with the invention will now be described in detail with reference to the accompanying drawing figures.

FIG. 8 is an exploded perspective view of FIG. 7;

FIG. 9 is a side view of the male member of FIG. 8;

FIG. 10 is a top view of the female member of FIG. 8;

FIG. 12 is a cross-sectional view taken along line 12—12 of FIG. 7.

Figure 1:
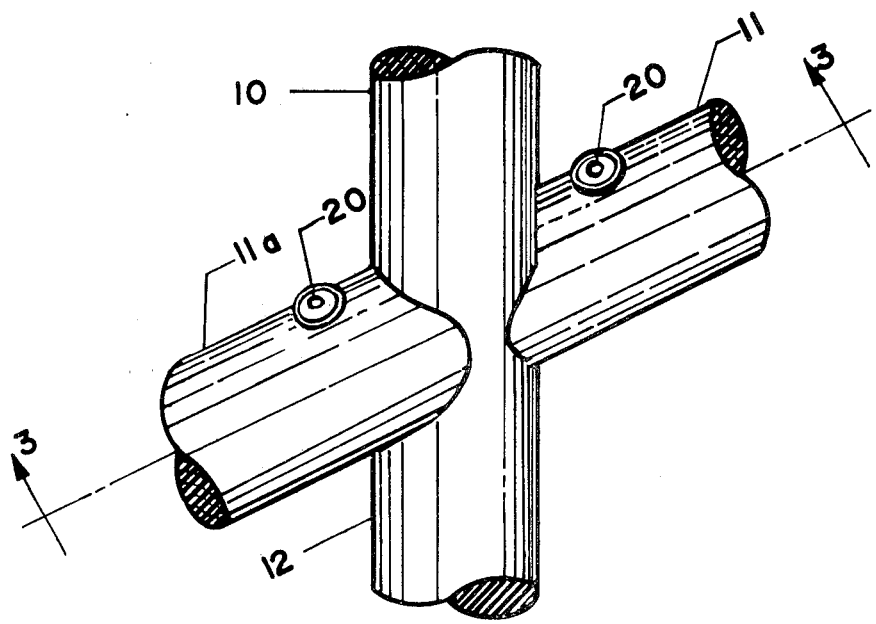
FIG. 1 is a perspective view of a first embodiment of an improved rattan joint in an assembled relation in accordance with this invention.

Referring now to the drawings in detail, there is shown in FIG. 1 an improved rattan joint of cross-shape construction indicated generally as 10 comprising two identical male members 11, 11a and a female member 12. All of said members are rattan poles which are cut into proper lengths.

Figure 3:
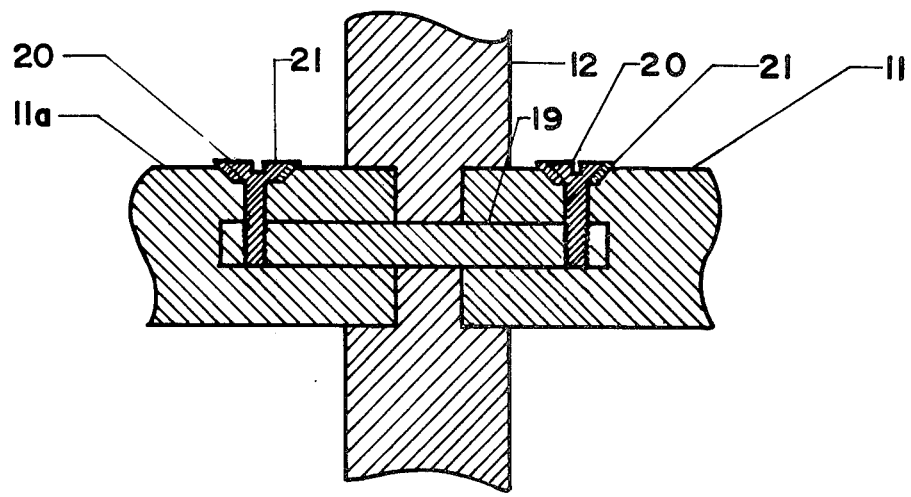
FIG. 3 is a cross-sectional view taken along line 3—3 of FIG. 1.
Figure 2:
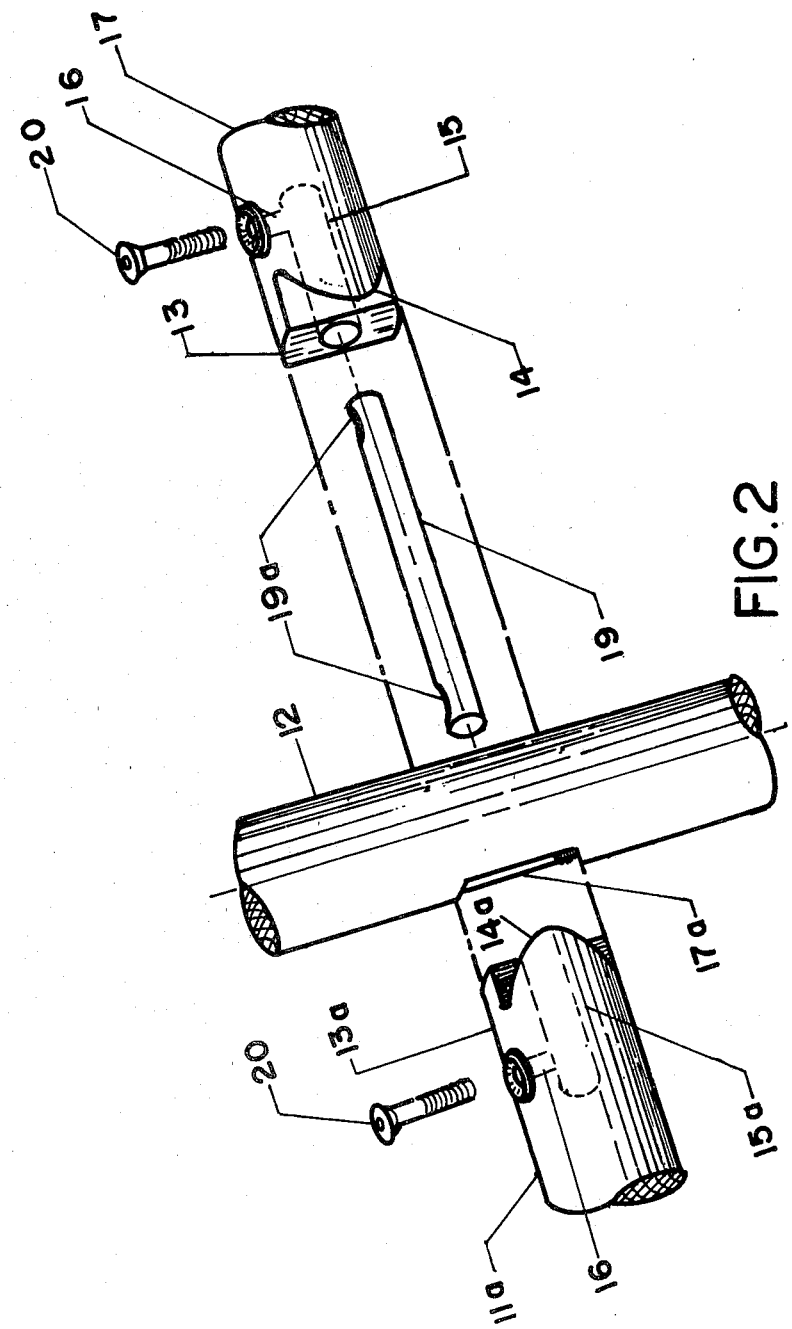
FIG. 2 is an exploded perspective view of FIG. 1.
Figure 4:
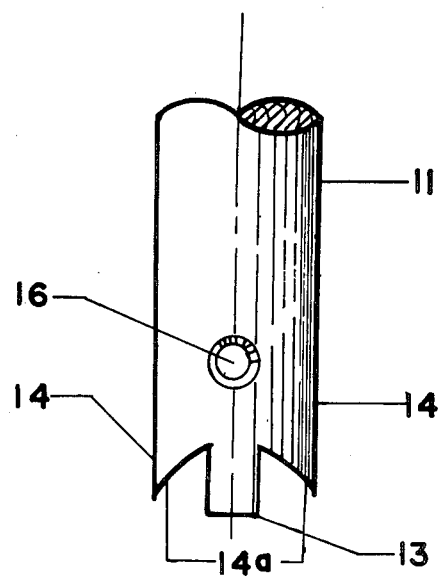
FIG. 4 is a side view of one of the male members of FIG. 1.
Figures 5, 6:
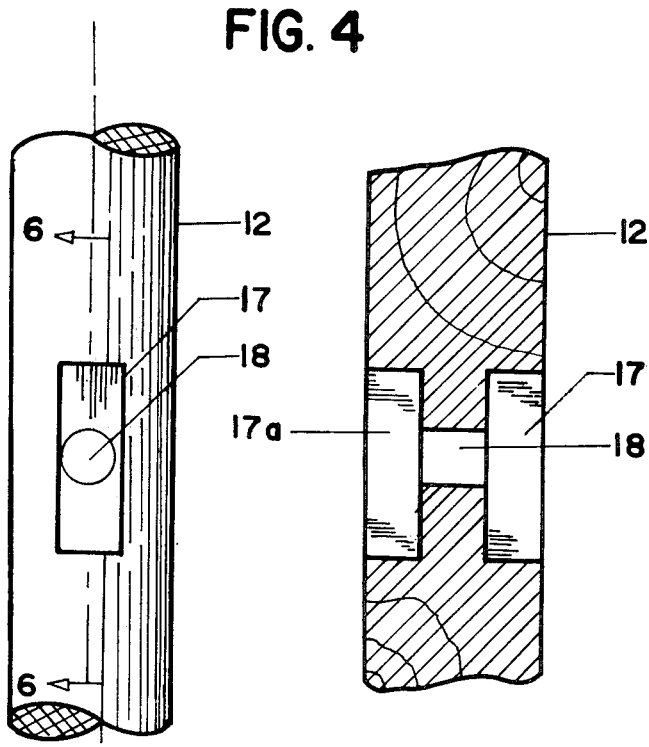
FIG. 5 is a side view of the female member of FIG. 1.
FIG. 6 is a cross-sectional view taken along line 6—6 of FIG. 5.
Figure 7:
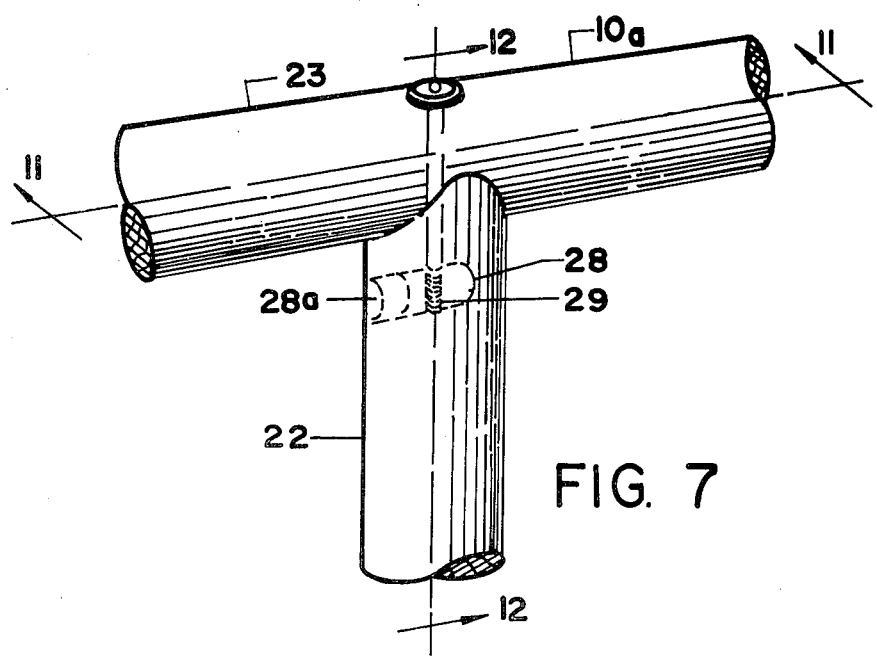
FIG. 7 is a perspective view of a second embodiment of an improved rattan joint.
Figure 11:
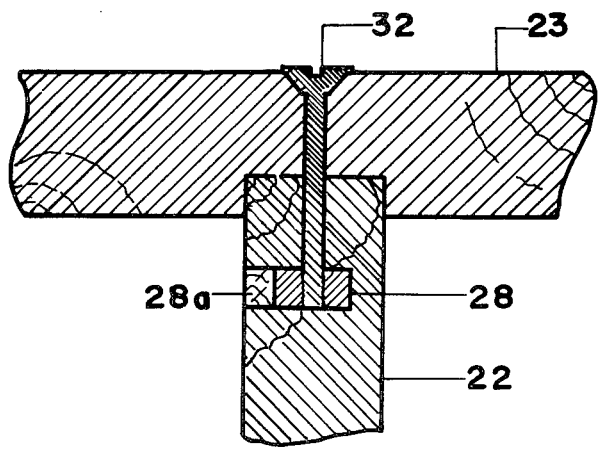
FIG. 11 is a cross-sectional view taken along line 11—11 of FIG. 7.

As clearly shown in FIGS. 2, 3 and 4, each of the male members 11, 11a comprises a diametrically disposed respective tongues 13, 13a of rectangular shape extending to the outermost layer thereof, said tongues defining side lips 14 each having an arcuate bottom face 14a adapted to rest on the curved surface of the female member. Identical blind bores 15, 15a are axially provided on each of said male members extending from the respective tongues and inwardly thereof. Proximate the inner end of each of said axial blind bores is provided with a vertical hole 16 communicating thereto.

As shown in FIGS. 2, 3, 5 and 6, the female member 12 is provided with oppositely disposed and axially positioned grooves 17, 17a complemental with the respective tongues 13, 13a. A transverse bore 18 having a diameter equal to the blind bores and coaxial therewith is provided between the grooves 17, 17a. A dowel 19 is adapted to be insertably positioned within the aligned axial blind bores and the transverse bore 18, said dowel having a countersunk threaded holes 19a proximate the ends thereof and in vertical alignment with the vertical holes 16. As clearly shown in FIGS. 1 and 3, the countersunk head screws 20 each having a metallic insert 21 are adapted to be screwed to the dowel 19 to firmly hold the male members 11, 11a together with the female member 12.

The second embodiment of the present invention is shown in FIGS. 7 to 12, inclusive. The rattan joint is of T-shape construction indicated generally as 10A employing similar tongue and groove joint and similar dowel and screw combination as the means for fastening said joint. As shown therein, said rattan joint comprises a male member 22 and a female member 23. Said male member comprises a diametrically disposed tongue 24 defining side lips 25 each having an arcuate bottom face 25a. A blind bore 26 is axially disposed at the inner end of said male member. Communicating to the inner end of said axial blind bore 26 is a transversely disposed blind bore 27. Insertably secured in said vertical blind bore is a dowel 28 having a threaded hole 29 transversely disposed and in axial alignment with the blind bore 26. The dowel is concealed by a rattan material 28a.

The female member 23 is provided on one side thereof a rectangular groove 30 complemental with the tongue 24, said groove having a transverse bore 31 disposed in alignment with the axial bore 26, when assembled. A countersunk head screw 32 having a head metallic insert 33 is screwably secured to the threaded hole 29 of the dowel 28 in order to firmly secure and strengthen the rattan joint.

As herein described, a dowel and screw combination is illustrated as one means of fastening and strengthening the tongue and groove connection. Other means of fastening as in the use of appropriate glue could also be utilized in the absence of the dowel and screw combination. However, it would defeat the purpose of a knockdown rattan joint.

The dowel 19 could be metallic or non-metallic as the case maybe and the screw could be of a wedge-type lock or the like.

It is to be understood that the present invention is by no means limited to the particular embodiments herein disclosed and/or shown in the drawings but also comprises any modification or equivalents within the scope of the disclosure.

What is claimed is:

1. An improved rattan joint comprising a pair of identical rattan pole male members each including at least one rectangular tongue positioned substantially on a diameter of said end together with an opposed pair of partially pole - encompassing arcuate side lips, a rattan pole female member having oppositely disposed grooves axially positioned thereon and complemental with the respective tongues of said male members fitted therein to form a cross-joint; and means for fastening together said male members and said female member.

2. An improved rattan joint in accordance with claim 1 wherein said fastening means comprises an axial blind bore provided on each of said male members and a transverse bore centrally disposed through the groove of said female member; a dowel connecting said male and female members extending through said blind bores and said transverse bore, said dowel having transverse threaded holes disposed proximate the ends thereof, and a pair of screws threadedly engaged with said threaded holes whereby said male members are fixed to said female member.

3. An improved rattan joint comprising a rattan pole male member having at least one rectangular tongue positioned substantially on a diameter of said end together with an opposed pair of partially pole - encompassing arcuate lateral lips, a rattan pole member having a groove axially positioned thereof on one side thereof and complemental with the tongue of said male member fitted therein to form a T-joint; and means for fastening said male and female members, said means comprising an axial blind bore provided on said male member and a transverse bore centrally disposed through the groove of said female member; a dowel transversely positioned on said axial blind bore, said dowel having transversely threaded hole positioned in alignment with said blind bore and a screw threadedly engaged to said dowel to firmly connect said male and female members; whereby the said male and female members become interconnected and form a working joint.

* * * * *